(12) United States Patent
    Khairetdinov (10) Patent No.: US 9,104,878 B1
(45) Date of Patent: Aug. 11, 2015

(54) AUTOMATED SOURCE CODE SCANNER FOR BACKDOORS AND OTHER PRE-DEFINED PATTERNS

(71) Applicant: Appercut Security Ltd., Toronto (CA)

(72) Inventor: Rustem Khairetdinov, Toronto (CA)

(73) Assignee: Appercut Security Ltd., Toronto, Ontario (CA)

( * ) Notice: Subject to any disclaimer, the term of this patent is extended or adjusted under 35 U.S.C. 154(b) by 0 days.

(21) Appl. No.: 14/103,344

(22) Filed: Dec. 11, 2013

(51) Int. Cl.
    *G06F 21/00* (2013.01)
    *G06F 21/57* (2013.01)

(52) U.S. Cl.
    CPC .................................... *G06F 21/577* (2013.01)

(58) Field of Classification Search
    USPC .......................................................... 726/25
    See application file for complete search history.

(56) References Cited

U.S. PATENT DOCUMENTS

| | | | |
|---|---|---|---|
| 6,016,467 A * | 1/2000 | Newsted et al. | 704/9 |
| 2003/0105620 A1 * | 6/2003 | Bowen | 703/22 |
| 2006/0269148 A1 * | 11/2006 | Farber et al. | 382/232 |
| 2008/0114725 A1 * | 5/2008 | Indeck et al. | 707/2 |
| 2012/0317136 A1 * | 12/2012 | Papish et al. | 707/769 |
| 2013/0007701 A1 * | 1/2013 | Sundararam | 717/109 |
| 2014/0282403 A1 * | 9/2014 | Frenkiel | 717/123 |

* cited by examiner

*Primary Examiner* — Mahfuzur Rahman
(74) *Attorney, Agent, or Firm* — Bardmesser Law Group (57) ABSTRACT

A method and computer program product for an automated source code scanner that focuses on a custom-written code and business processes. A core scanning module receives source code as a plaintext from a pre-determined port and compares the source code against a pre-created pattern database. The results of the comparison are exported for further use and analysis in a form that indicates a location of the found match and a short description of the pattern that matched the source code. The source code scanner can work with multiple programming languages. The source code scanner can be easily adjusted for any additional languages. The scanner core also contains a tool for pattern database maintenance that allows the user to remove or edit current patterns as needed.

15 Claims, 5 Drawing Sheets

AUTOMATED SOURCE CODE SCANNER FOR BACKDOORS AND OTHER PRE-DEFINED PATTERNS

BACKGROUND OF THE INVENTION

1. Field of the Invention

The present invention relates to code scanning and, more specifically, to a method and computer program product for scanning the source code for pre-defined patterns.

2. Background Art

A typical enterprise in a public sector, as well as enterprises in the banking sector, often uses several programs that are custom-written internally by in-house developers or outside contractors. Most of these programs have no external connection, and, as a result, are rarely audited in their entirety. These programs generally deal with business processes, and, as such, are rarely manually audited, since such an audit is expensive and would stop all internal processes for weeks. Yet, a developer can insert a backdoor access code, hardcoded passwords and other login and authentication data in a form of a malicious code injection into the source code. Thus, the developer can gain access to some resources and bank accounts using the custom code he had written. Therefore, the code needs to be checked. However, manual analysis of hundreds of thousands of lines of code would take a long time. During this time the business processes would have to be interrupted. Note that code audit has to be performed by a third party and not by the developing team that produced the code.

Code parsers are computer programs that can perform syntax analysis of the code. However, the conventional code parsers do not detect most of the vulnerabilities created by dishonest developers. Furthermore, the conventional parsers do not parse the executable code on-the-fly. Conventional scanners scan for potential vulnerabilities that are introduced by careless developers, rather than malicious ones. As such, better-hidden vulnerabilities are ignored by conventional scanners by design.

Accordingly, there is a need in the art for an automated scanning solution that provides the enterprises with an ability to scan the code of their business process software without freezing the business processes for a long period of time.

SUMMARY OF THE INVENTION

The present invention relates to a method and computer program product for an automated code scanner that substantially obviates one or more of the disadvantages of the conventional art.

An exemplary embodiment is directed to a method and computer program product for a source code scanner that focuses on a custom-written code and business processes. A core scanning module receives source code as a plaintext from a pre-determined port and compares the source code against a pre-created pattern database. The results of the comparison are exported for further use and analysis in a form that indicates a location of the found match and a short description of the pattern that matched the source code. The exemplary source code scanner can work with multiple programming languages. The source code scanner can be easily adjusted for any additional languages. The core also contains a tool for pattern database maintenance that allows the user to remove or edit current patterns as needed.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

In one aspect a method and computer program product for a source code scanner that focuses on a custom-written code and business processes are provided. A core scanning module (i.e., the scanner core) receives a source code as a plaintext from a pre-determined port (i.e., port 12000 by default) and compares the source code against a pre-created pattern database. The results of the comparison are exported for further use and analysis in a form that indicates a location of the found match and a short description of the pattern that matched the source code. The exemplary source code scanner can work with multiple programming languages.

According to the exemplary, the source code scanner can be easily adjusted for any additional languages by adding a language module to the scanner. The core scanner also contains a tool for pattern database maintenance that allows the user to remove or edit current patterns as needed. Several of the OWASP (Open Web Application Security Project) top 10 vulnerabilities are scanned for by the exemplary source code scanner, including SQL and LDAP injections, insecure direct object references, missing function level access control, and cross-site scripting (XSS) and cross-site request forgery, using known vulnerable components, unvalidated redirects and forwards, etc.

In case of the injections, the source code is scanned for insufficient security checking of user input, which could lead to a malicious injection. If the code accepts user input, it is scanned for proper sanitization protocols. If the sanitization protocols are not found, the scanner returns a vulnerability code.

In case of the XSS, the source code is scanned for an un-sanitized user input for pages, which could allow a user to run any code on the server disguising it as a redirect. If the code deals with accepting redirects from the pages, it is scanned for proper sanitization protocols, and if they're not found, the vulnerability code is returned.

According to the exemplary embodiment, the automated code scanner catches the regular expression filtration for PL/SQL. When a user enters an SQL query, it is interpreted by the PL/SQL software, which connects to the database and executes the SQL query. If the query itself is not checked, the user can slip in a regular expression into the query, providing the user with some extra control over the result. For example, if a system asks for a credit card number, and the user enters the expression (.*), the system will return the numbers of all credit cards stored, since they all qualify for that mask. The source code scanner scans the PL/SQL code to verify that it checks for regular expression exploits, in particular, screening out special characters (^,*,?,{.}, etc.), as well as escape characters, such as "\." In this scenario, for example, the credit card query is checked to match a 16-digit number format. The (.*) query would then be rejected by the system.

The patterns are either pre-created by code audit experts, or created by the client, usually after undergoing training. The core scanner also contains a tool for pattern database maintenance that allows the user to remove or edit current patterns as required. The source code should be compliant with OWASP standards after the dangerous code is removed.

According to the exemplary embodiment, the scanner core uses a compiled pattern database.

Figure 1:
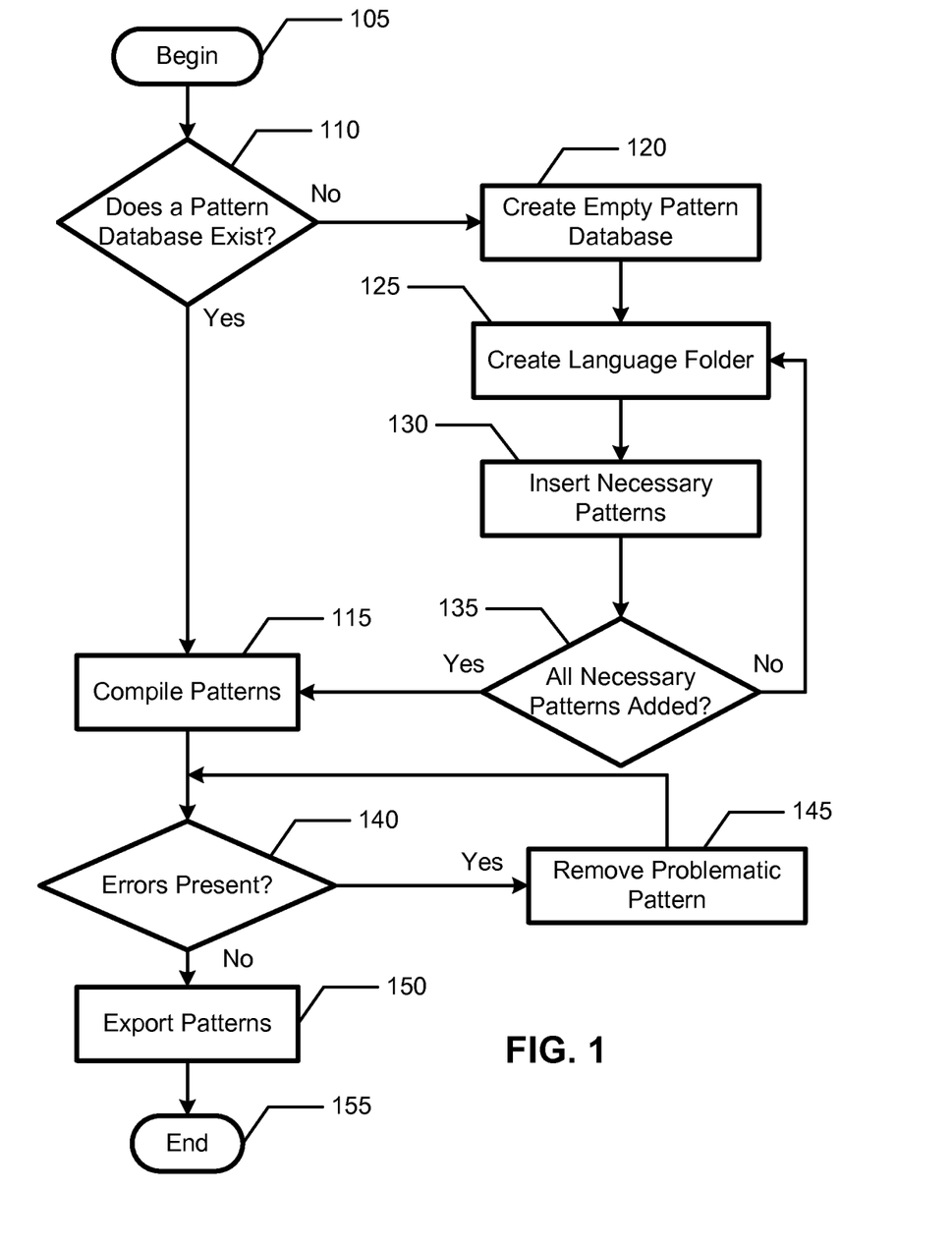
FIG. 1 illustrates a flow chart of a method for creating a pattern database, in accordance with the exemplary embodiment.

In order to perform the source code scans, the core scanner needs to access the compiled pattern database. FIG. 1 illustrates a flow chart of a method for creating a pattern database, in accordance with the exemplary embodiment. The process begins in step 105 and checks if a pattern database exists in step 110. If the pattern database exists, the process compiles the patterns in step 115. If the compilation produces errors in step 140, a problematic pattern is removed in step 145 and the process continues to compile the patterns in step 140. If the compilation does not produce errors in step 140, the process exports the pattern in step 150 and the process ends in step 155.

If, in step 110, the pattern database does not exist, the process creates an empty pattern database in step 120. The language folder is created in step 125 and the necessary patterns are inserted in the pattern database in step 130. The process checks if all the necessary patterns are added in step 135. If all the necessary patterns are added in step 135, the process compiles the patterns in step 115. If the patterns are not added, the process returns to step 125.

According to the exemplary embodiment, the core continuously scans the input port (port 12000 by default, but can be changed to any free port by the administrator) for incoming source code presented in plaintext. A source code programming language can be either marked beforehand by a web application that sends the code with a tag or auto-recognized based on the file extension of the source code (i.e., files with the extension .cpp are scanned for C++, .Java files for Java, etc.). Once the core detects the incoming text, it starts the scanning process for every file detected using the language provided.

In order to limit the amount of work performed by the scanner, only the patterns in selected languages are used. The input code files are scanned for each pattern one at a time, and compared to the tokens present in the patterns. The tokens are matched strictly with whitespaces or comments allowed in between, while the token groups are scanned in order. The token is created when the pattern is created. The token consists of the smallest chunk of code scanned by the scanner. The created pattern consists of a series of tokens, either organized into groups for strict order-based scanning or for separate scanning one token at a time.

Figure 2:
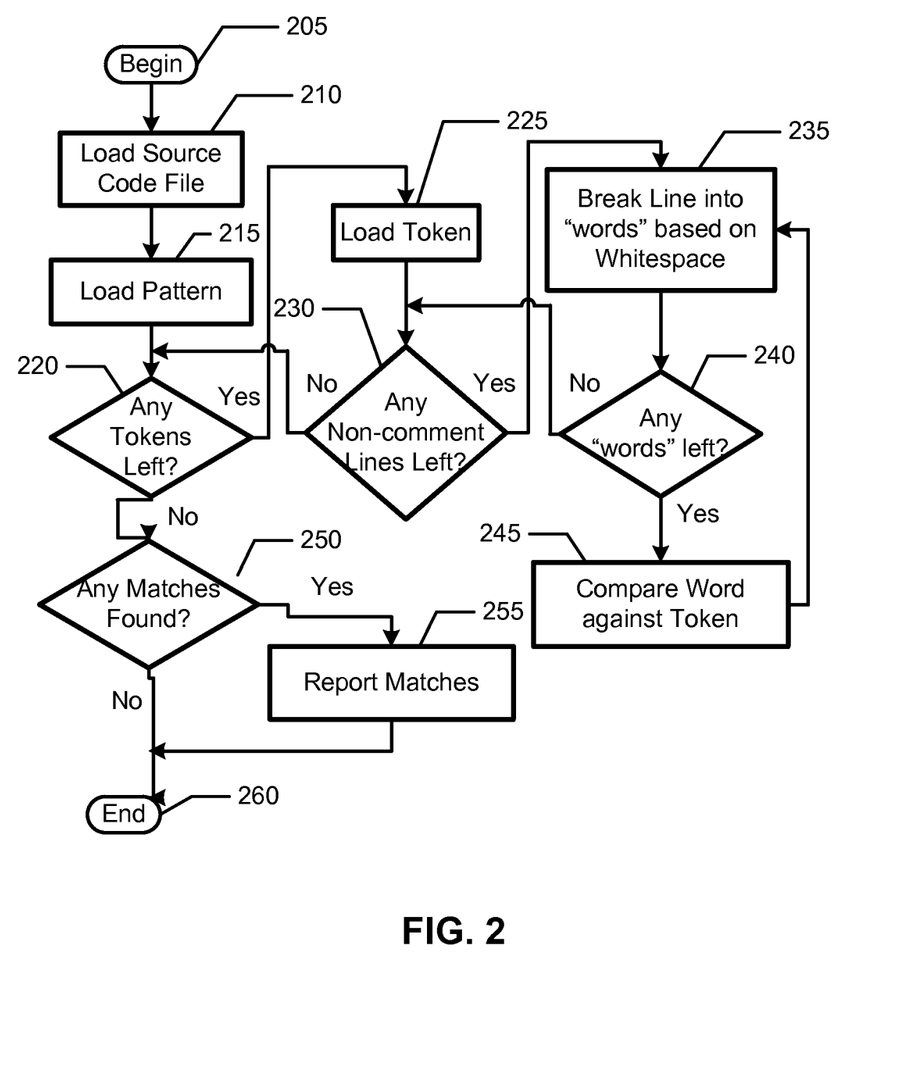
FIG. 2 illustrates a flow chart of the process of matching tokens from a pattern to the source code, in accordance with the exemplary embodiment.

FIG. 2 illustrates a flow chart of the process of matching tokens from a pattern to the source code, in accordance with the exemplary embodiment. The process begins in step 205 and loads a source code file into a scanner in step 210. Then, the process loads a pattern in step 215. In step 220, the process checks if any tokens are left. If the token is found, the process loads the token in step 225. In step 230, the process checks if any non-comment lines are left in the source code. If some code lines are left, the process breaks the code lines into "words" based on white space in step 235. Then, if any words are left in step 240, the process compares the word against the token in step 245, and returns to 235

Otherwise, the process returns to step 230 and checks if any non-comment lines are left in the code. If no lines are left, the process returns to step 220 and checks if any tokens are left. If no more tokens are left, the process checks if any matches are found in step 250. If the matches are found, the process reports matches in step 255, and the process ends in step 260. Otherwise the process ends in step 250.

Figure 3:
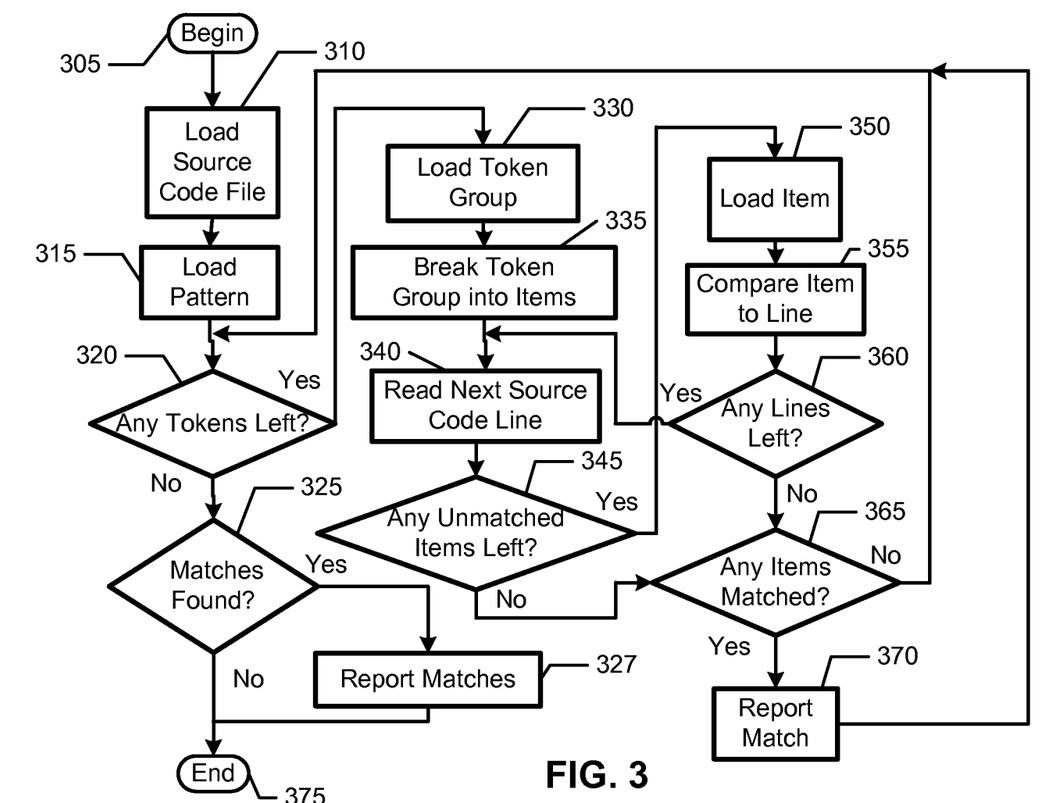
FIG. 3 illustrates a flow chart of the process of matching token groups from a pattern against the source code, in accordance with the exemplary embodiment.

FIG. 3 illustrates a flow chart of the process of matching token groups from a pattern against the source code, in accordance with the exemplary embodiment. In step 305 the process is started. The process loads a source code file into a scanner in step 310. Then, the process loads a pattern in step 315. The process checks if any tokens are left in step 320. If the tokens are left, the process loads a token group in step 330. The process breaks the token group into items in step 335. The process reads the next source code line in step 340. The process checks if any unmatched items are left in step 345. If there are unmatched items left, the process loads the item in step 350.

The process compares the item to a code line in step 355. If there are any lines left in step 360, the process reads the next source code line in step 340. If there are any unmatched items left in step 345, the process returns to step 350 and loads the item. Otherwise, the process checks if there are any matched items in step 365. If the matched items are present, the process reports the matches in step 370 and returns to step 320. Otherwise, the process returns to step 320 directly. If, no tokens are left in step 320, the process checks if any matches are found in step 325. If the matches are found, the process reports matches in step 327, and the process ends in step 375. Otherwise the process ends in step 375.

Figure 4:
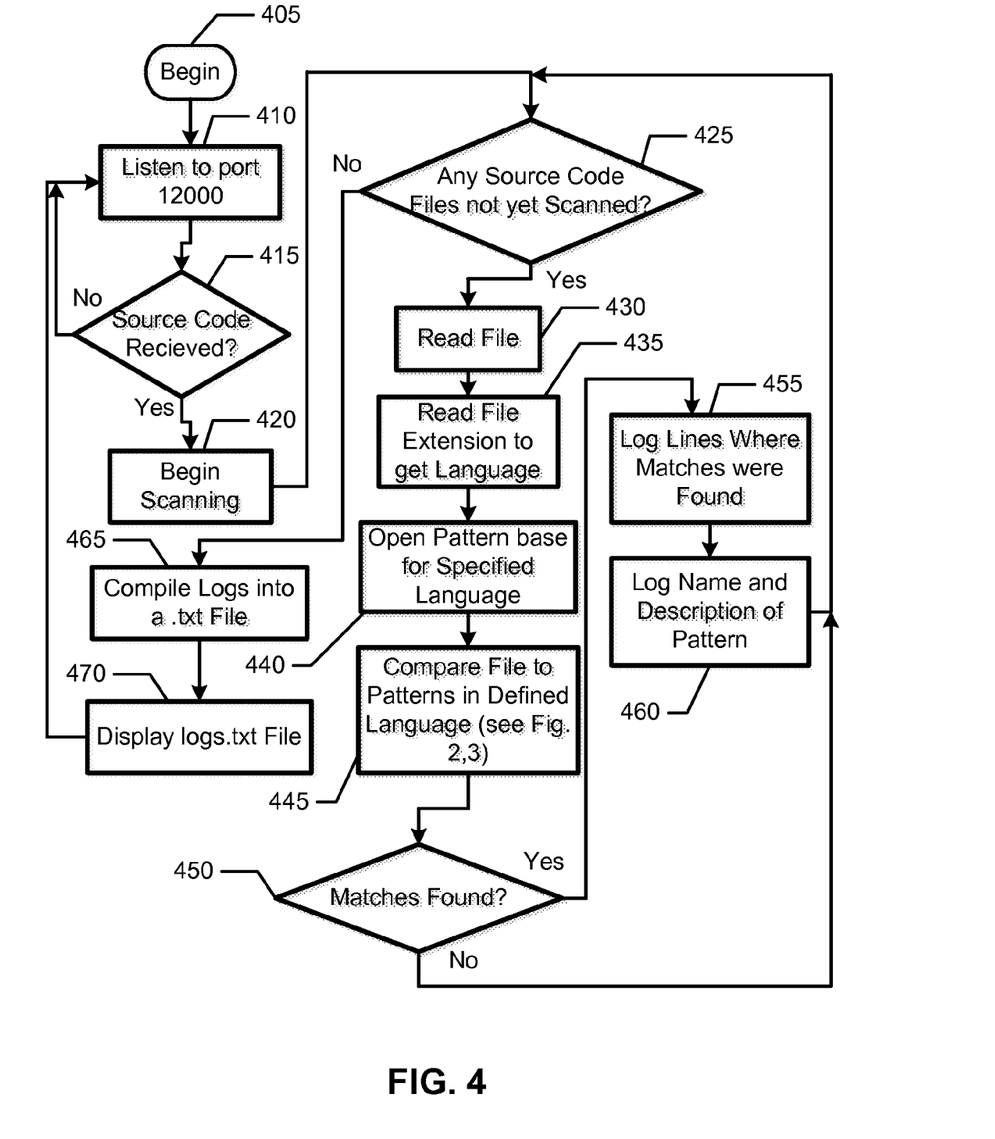
FIG. 4 illustrates a flow chart of the entire process of receiving the source code, scanning it and outputting the results.

FIG. 4 illustrates a flow chart of the entire process of receiving the source code, scanning it and outputting the results. The scanning process begins in step 405. The process listens to a designated port 12000 in step 415. If the source code is received through the port in step 415, the process begins scanning of the source code in step 420. Otherwise the process continues to listen to the port 12000 in step 415. In step 425, the process check if any of the source code files are un-scanned. If the files are not yet scanned, the process compiles logs into text files in step 465 and display logs in step 470, in order to show the user the found results. Then, the process returns to step 410.

If, in step 425, there are source code files that are not yet scanned, the process reads the file in step 430. In step 435, the process reads a file extension to determine the programming language. The process opens the pattern database for the specified language in step 440. In step 445, the process compares the file against the patterns for the defined programming language (as shown in FIGS. 2 and 3). If the matches are found in step 450, the process logs the code lines where the matches have been found in step 455. The process logs the name and the description of the matching pattern in step 460. Then, the process returns to step 425. If no matches are found in step 450, the process returns to step 425.

According to the exemplary embodiment, after the pattern database is compiled and the core scanner is connected to the pattern database, the actual scan can begin. If any matches to the patterns are found within the source code, the matches are reported. According to the exemplary embodiment, the core scanner is a combination of UI tools and a matching service.

The UI tools allow a user to pass SAP ABAP4, C/C++, C#, Java, JavaScript, Oracle PL/SQL, Transact-SQL, 1C v7/8, Visual Basic, LotusScript, Delphi, Python program sources to the matching service for analysis. Other programming languages can be added to the core scanner. The core scanner module application contains sources, $3^{rd}$ party libraries, unit tests with test files and build instructions, such as for example:

build.properties—property file to define JDK 1.6 Java compiler
    build.xml—apache ant build instructions
    conf—application configuration files
    lib—3rd party libraries—binaries
    lib-src—3rd party libraries—sources
    resources—application resources
    src—main source files
    test—unit tests source files
    testFiles—test files to run unit tests for Program Code Accessors.
    Each <accessor> element has the following parameters:
    id—unique accessor identifier;
    type—accessor type enum, the only supported value—FILE.

For accessors of type FILE several <fileset> elements can be defined. For each fileset a base directory is specified as element attribute "dir" and a sequence of <include> and <exclude> regular expressions (regular expression basic syntax can be found at http:**www.regularexpressions.info/reference.html).

According to the exemplary embodiment, the scanner uses the file accessors to scan file system and get files that match the "include" and do not match the "exclude" regular expressions. The programming language for application of a particular pattern is detected by file extensions. For example:

registered extensions for Java programming sources are java, js, jsp; for JavaScript -js; for C/C++-c, cpp, h; for C#-cs; for PL/SQL and Transact-SQL -sql; for Visual Basic -frm, mod, cls, bas, vb; for LotusScript -lss, lsl, ltm; for Delphi -pas; for Python -py. Note that other files as well as files without extensions are treated as SAP ABAP4 ones.

The core scanner includes <schedule> elements. The scanner analyses the configuration and invokes program codes processing for each schedule and outputs processing results to the service log files. Each <schedule> has the following parameters:

cron—CRON (http://ru.wikipedia.org/wiki/Cron) schedule; and
    description—a human readable description.

For example a<schedule> element can look like:
    <schedule cron="* * * * *" description="Every 1 minute">

For each schedule, one or more accessors are defined as references to the configured under the <accessors> section. The reference element is <accessor-ref> with an attribute id.

According to the exemplary embodiment, the pattern database location is specified in the <patterns> element as a "path" attribute value. The scanner service scans the folder and automatically loads pdl files containing programming code pattern definition—pattern base elements. The folder should be of a structure:

Folder
    Abap4
    pattern1.pdl
    pattern2.pdl
    . . .
    patternN.pdl According to the exemplary embodiment, a server implements external communication API through the server component. The <server> element contains the following attributes of the component configuration:

port—TCP port to listen for incoming connections at threads;
    size of the thread pool to process incoming connection.

According to the exemplary embodiment, a Pattern Base Manager is implemented. To switch to the pattern base manager screen the user can click on Show View and go to the Pattern Base Manager menu item.

Once the screen is active the user may create a new or open and manage an existing pattern base. For example, the pattern base from unit test files can be used. To open the example base the user can choose File Open menu item, navigate to test Files folder of the module root folder and select pattern base-full folder. In order to create a new pattern base, the user can choose File New menu item and build pattern base tree structure using Edit→Add Note and Edit→Remove Node menu items. The manager left tree view pane shows the pattern base structure with the pattern base name as a root node, programming language as the first level child and suspicious code patterns as the second level children. The right pane of the manager shows and the pattern base data and lets the user to modify it. At the pattern base level, the user can modify the pattern base description based on the suspicious code patterns. The pattern name, description, token and content can be modified.

According to the exemplary embodiment, the rules to define a suspicious code pattern are as follows:

name—can be any string id that is unique for the current base; the name should not contain whitespaces and escape characters;
    description—human readable pattern description;
    content—suspicious code pattern content in PDL notation;

The user can see the valid pattern details by viewing a test base at testFiles/patternbase-full. To save the modified pattern base the user can choose File→Save menu item and select newly created folder to store the pattern base. The pattern base is stored in the file system as a number of files and folders in the below structure:

base-root—pattern base root folder;
    Abap4—programming code language name;
    Lexer1.pdl—pattern folder;
    Lexer2.pdl—pattern folder;
    Lexer3.pdl—pattern folder;
    .appercut—pattern base attribute file.

In order to switch to the scanner screen, the user can choose Show View→Source Code Scanner menu item. The scanner screen allows the user to provide pattern base folder and folder to look for source codes to analyze. The source codes folder is scanned recursively for files with extension *.txt. The scanner sends the sources one by one for analysis. The sources are sent either to a remote service (if it is up and running) or processed locally by loading exported pattern files. To use the service for sources analysis, the service should be started before the scanner starts processing the files. The service is located through the URL having the following format:

http:**<host>:<port>/sourceCodeAnalyzer

In order to load compiled pattern base files by the UI application and analyze the sources the scanner service URL uses the following format:

file:/<local-path-to-compiled-pattern-base

Note that the Browse button labeled as " . . . " can be used to browse local file system and select pattern base. It is possible to specify exported pattern base instead of URL of the scanner service. The user can click the browse button next to the URL text field and choose compiled pattern base root folder. The pre-exported example pattern base is located at testFiles/patternbase-full.

Once the scan is finished, the user can check the matched code blocks for each matched source file and pattern. The exemplary pattern base located at testFiles/patternbase-full contains a number of demo patterns for the programming languages supported by the scanner engine. According to the exemplary embodiment, the patterns should match the hard coded user login strings. For example, the pattern has to match the programming code that contains current user login comparison with a string constant:

IF SY-UNAME='SMITH' or IF SY-UNAME='SMITH'. Lines like this should not appear in the code, and any occurrence of this should be analyzed case by case. Other patterns match programming language-specific vulnerabilities. The exemplary embodiment uses the Pattern Definition Language (PDL). The PDL is designed to segregate pattern definition and implementation levels. The PDL allows defining only pattern-specific grammar blocks hiding all the base grammar defined for the underlying language. While the PDL patterns are processed by the scanner, they are enriched with the base grammar defined for the underlying language. The patterns in PDL consist of token groups and token items within the groups. The token items within the groups are matched strictly—only whitespaces or comments are allowed in between. The token groups are matched less strictly—only order sequence matters, all the language constructions detected between the groups are skipped.

The token items are defined as "token-text" for specific text tokens. General tokens of keyword type are defined as $keyword, of string or char literal type as $string or $char, etc. The token items within a group are defined as a list separated by logical operators surrounded by brackets—e.g., { and}. The logical operators are conjunction and disjunction. The disjunction is defined as a pipe symbol. The conjunction is an empty symbol or a whitespace. Any token item or a group can have a cardinality flag that is appended to a token or a group:

?—optional, one or zero occurrence;
*—zero or more occurrences;
+—one or more occurrences.

Any token item can be prefixed with NOT modifier - ~. This means anything else than this token. For example: ~';' or ~(';'|'+') or ~$identifier. Any wildcard is supported by PDL to match any token within a group. The tokens within a group can be formed into an expression by joining them via logical operators and applying brackets (,). The optional mark can be applied to a token expression.

The PDL also allows comments. The line comment starts with double slash //. The multiline block comment starts with /* and ends with */ The PDL allows calls to built-in functions within a pattern group—actions and predicates. Syntax for an action is actionName(argumentList). Actions are used to perform extra logic on the group content—map variables. etc. The syntax for predicates is predicateName(argumentList)?.

The predicates also perform extra logic on a group content, but return a Boolean value—true or false. In case of a predicate returning a false value, the whole group is not matched in the pattern. The PDL allows for mapping variables to a token within a pattern and check back if those variables are mapped. The scanner checks if a token that is matched in the beginning of a pattern is used later (e.g., if a variable that is initialized with user supplied data is used later in a critical function). To map a variable to a token an action map (name, identifier) is used. The action is called within a group to map an identifier to a name. For example:

{a=$identifier '='"Request"'.'"QueryString' map("var", a)}

In this example any $identifier is mapped to a key "var". Thus, the engine stores the key of the identifier to assert it later. Any variable that is mapped using map( . . . ) can be asserted later in the pattern definition via a call to the predicate assertMapped(name, identifier)?.

For example:

{'.'"Execute"'('$string '&'a=$identifier) assertMapped ("var", a)?}

In this example the group is matched only if the $identifier was previously mapped to "var". The overall pattern {a=$identifier '='"Request"'.'"QueryString' map("var", a)}
{'.'"Execute"'(' $string '&' a=$identifier) assertMapped ("var", a)?} matches a program code that reads data from a request and stores the data to a variable which is used later to build a command that is executed in runtime. It is also possible to check if a variable is not mapped using the predicate assertNotMapped ("var",identifier)?

Action unmap ("var", identifier) removes an existing variable mapping. The PDL allows for tracing variables, so that a pattern is robust against variable transitivity. This is done via a call to action remap("var", a, b). The action is called within a group to trace the previously mapped variable a to its transit entity b. For example, the group {b=$identifier ',' a=$identifier remap("var", a, b)}+ matches one or many assignment operators when the right operand is a token previously bound to "var". In any following groups of the pattern a call to assertMapped( . . . )? will match all variables mapped and traced under the given name.

The PDL allows for checking a token text using regular expressions. For example, the group {$identifier ','b=$identifier[R\.+t]} matches only if the identifier labeled as b matches regular expression "R.+t"—i.e., starts with R, ends with t and has one or more symbols in between—for example "Request". Some patterns can require checking if a group is not matched rather than matched.

One of the examples is:
match any variable that has been a) assigned a value from user input and b) passed as a parameter to a critical function, but c) its value is not previously checked or sanitized.

In this example, a pattern definition is a AND (NOT c) AND b.

The PDL has a special modifier for this case—an exclamation mark that is appended to the group definition—{definition}!.

The following code illustrates this case:

String login=Request.getParameter("login"); //user-supplied value//validate user supplied data, escape or encode it login=sanitize_function(login);
  if (critical_function(login)) {
    // do something}

Here the pattern should match only if sanitize_function is not called for login. The PDL definition can look as following:

{a=$identifier '='"Request"'.''getParameter''('"login"')'map("a", a)}
{'sanitize_function''('a=$identifier ')'assertMapped("a", a)?}!
{'critical_function''('a=$identifier')'assertMapped("a", a)?}

Note that the second group has the NOT modifier appended.

A hidden group modifier can be used. A group that is used only to execute an action and is not a meaningful part of a pattern may be applied to the hidden group modifier.

The first group of the above example then may look like:
{a=$identifier '='"Request"'.''getParameter''('"login"')'map("a", a)}

By default, all the expressions within a PDL group are greedy. This means that if an expression is defined as (.)* 'Hello', the scanner will match the block (.)* till the end of a file and not match 'Hello' even if it exists in the file. The solution to this is to switch greediness off by specifying !greedy before a token or expression: (!greedy.)* 'Hello'.

This pattern will match anything before 'Hello' token and, then, match the 'Hello' token itself. The greediness switcher construction affects all the expressions of the same scope. The brackets are used to limit the scope. The patterns in SPDL are defined as a sequence of groups surrounded by { and }—in the same way as in PDL. All the groups are matched via a logical AND operator—if any of the groups fails, then the pattern fails. All the items within an SPDL group refer to PDL patterns of the same base by name.

According to the exemplary embodiment, conditional matching is used. The conditional match looks like:
{A:B}

While processing the pattern, the scanner engine will match B only in files where A matches. From all the files of the current project a sub-set is selected by applying pattern A, and this sub-set is applied to the pattern B. All the files of the sub-set that fail to match to B are returned by the scanner as bad ones.

Match all looks like:
{all, ?[regex]:A}

The scanner selects a sub-set of files of the current project that have file names matching the regex. Then, the scanner tries to match A to all the files of the sub-set. All the files of the sub-set that fail to match to A are returned by the scanner as bad ones.

Matching for existence looks like:
{exists, ?[regex]:B}

The scanner selects a sub-set of files of the current project that have file names matching the regex. Then, the scanner tries to find at least one file in the sub-set that matches to B. If nothing is found, the scanner returns error code indicating the SPDL pattern failure. Anything that is referred as A and B in the above pattern groups can be a logical expression in PDL patterns of the same pattern base. AND, OR and NOT are the supported logical operators that are defined as <space>, | and ! correspondingly.

For example:
{'#''define' $keyword}

The exemplary scanner engine, while scanning source codes, uses the pattern to match something like:
define true or #define contine or #define for but will not match #define AAAA because AAAA is not a keyword {'for' $identifier 'in' $identifier}
{'loop'}
{'end''loop'}

The PL/SQL PDL pattern contains three groups. The pattern is to match any PL/SQL for-loop statements regardless of what is defined as the loop body—anything that is detected between the matched groups is skipped by the scanner engine.

{'GENERATE''REPORT''FROM'?}

The SAP Abap4 PDL pattern contains a group of three tokens. The last of the tokens is optional. The scanner engine will match the pattern even if "from" keyword is missing in the analyzed source codes.

{('MODIFY'|'DELETE'| 'UPDATE'|'INSERT') 'AGR_USERS'}

The SAP Abap4 PDL pattern contains a group of tokens. First set of tokens within the group form an expression that means match if any of the following occurs: MODIFY or DELETE or UPDATE or INSERT. The full pattern will match, if the first token expression matches and ARG_USERS occur.

{('+'|'−')?}
{('='''−')?}

This demo PDL pattern contains two groups. First group is an expression that means match if+OR occurs, and this expression is optional. Second groups is an expression that means match if=AND then−occurs, and this expression is also optional.

{'for' $identifier 'in' $identifier}
{'loop'}
{'end''loop'}?

The above PL/SQL PDL pattern is a slight variation of a second example. The only difference is that the last group of tokens is optional.

{~'+'*}

This pattern matches anything else except for plus zero or more times. Usually, this is used to skip anything else than a plus.

Another exemplary pattern is:
{
('procedure'|'function')
(~'(')* '('
v=$identifier map("v", v
((~',')* ',' v=$identifier map("v", v))*
}
{a=$identifier ':=' $charstring[(?i)select|insert]
(!greedy v=. remap("v", v, a))+';'
assertMapped("v", a)?
}

This is a PL/SQL pattern. The first group matches a function or a procedure declaration header with procedure or function keyword ('procedure'|'function'), skipping anything else except opening bracket (~'(')*, matching opening bracket '(', matching identifier and mapping it under name "v"–v=$identifier map("v", v) and, then, repeating the block of skipping anything else except for comma and matching comma and matching and mapping identifier under name "v" zero or more times ((~',')* ',' v=$identifier map("v", v))*.

The second group matches an identifier followed by an assignment operator and then followed by a character string that matches case insensitive regular expression a=$identifier ':=' $charstring[(? i)select|insert]. Then all the tokens are matched in non-greedy mode until ';' and all the matched tokens are attempted to be re-mapped under a name "v"– (!greedy v=. remap("v", v, a))+';'. In the end of the group a check is done whether an identifier "a" is mapped under name "v"–assertMapped("v", a)?. If the check fails, then the whole group fails. This pattern detects any attempts to concatenate tokens that are previously used in the function or procedure declaration to a string that contains "select" or "insert". Note that other patterns can be used by the exemplary scanner in accordance with a programming language of a source code.

Those skilled in the art will appreciate that the proposed scanner can scan the source code automatically without freezing a business process for a long time in case of a manual scan by an auditor.

Figure 5:
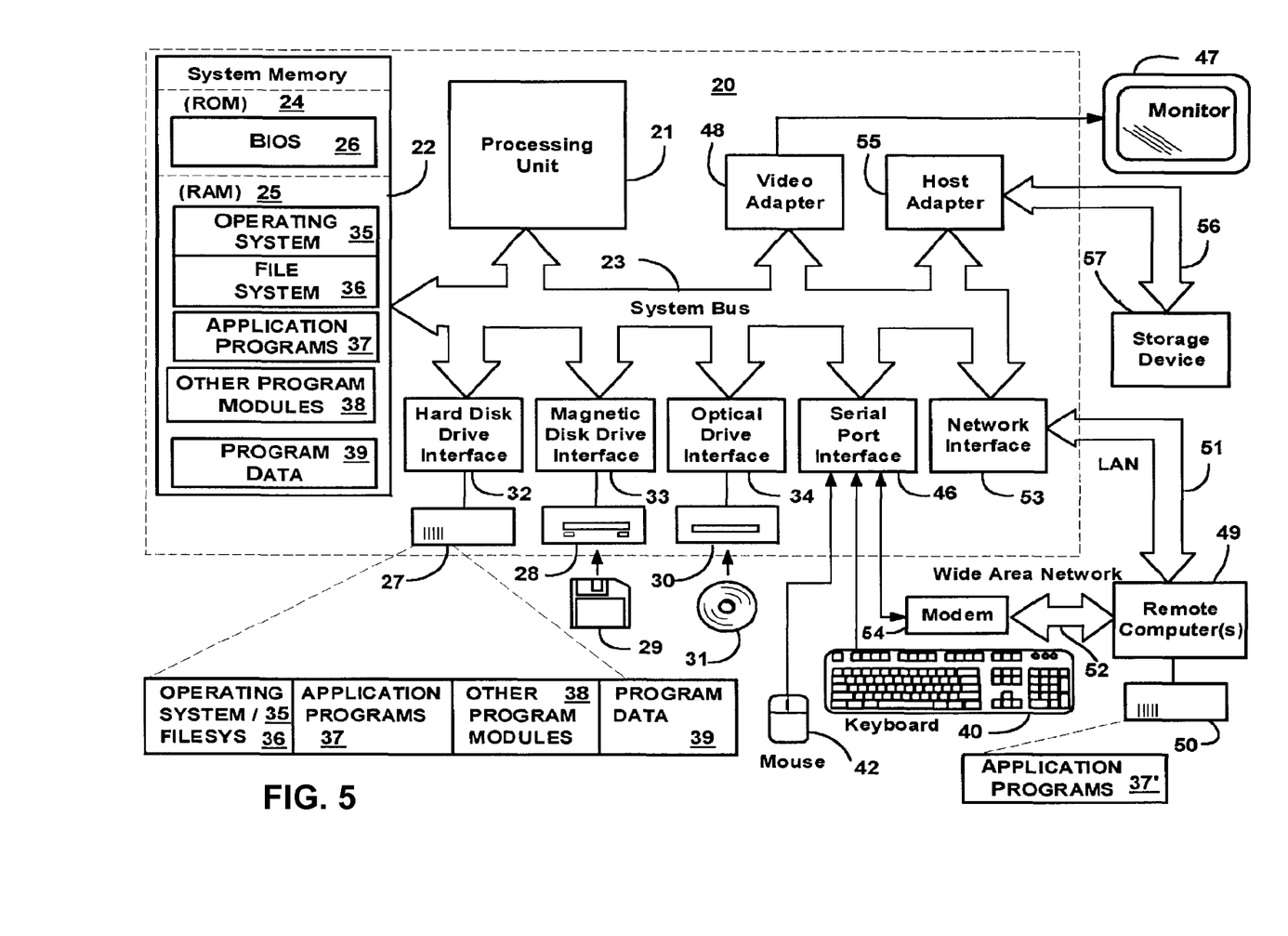
FIG. 5 illustrates a schematic diagram of an exemplary computer or server that can be used in the invention.

With reference to FIG. 5, an exemplary system for implementing the invention includes a general purpose computing device in the form of a personal computer 20 or a server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communication link between the computers can be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for automated scanning of a source code, the method comprising:
    (a) generating patterns that correspond to malicious vulnerabilities in the source code and storing the patterns in a pattern database;
    (b) enabling communication between a scanner module and the pattern database;
    (c) listening to a port for the source code;
    (d) detecting the source code and loading the source code into the scanner;
    (e) generating tokens from the source code, the tokens representing source code structure relating to variables and constants;
    (f) determining a program language of the source code;
    (g) loading the patterns into the scanner corresponding to the program language of the source code;
    (h) comparing a line of source code to the tokens;
    (i) comparing the patterns against the tokens, if matches are found in the line of the source code;
    (j) recording locations of the tokens that match the patterns;
    (k) providing a location of a match and a description of the pattern to a user;
    (l) deleting a matched portion of the source code; and
    (m) repeating the steps (g)-(l) for a next line of the source code.

2. The method of claim 1, wherein the token is a smallest chunk of source code.

3. The method of claim 1, further comprising assembling the tokens into a group such that the group represents a logical or mathematical expression and loading the group into the scanner module.

4. The method of claim 3, further comprising breaking the token groups into items.

5. The method of claim 4, further comprising comparing the items against the source code line.

6. The method of claim 3, further comprising comparing the words against the tokens.

7. The method of claim 1, further comprising breaking a line of the source code into words based on white spaces.

8. The method of claim 1, further comprising logging code lines where matches to the patterns are found.

9. The method of claim 1, further comprising logging a name and a description of the pattern, which matches the source code.

10. The method of claim 9, further comprising compiling logs into a text format.

11. The method of claim 1, further comprising determining the program language of the source code by reading a source code file extension.

12. A system for an automated source code scanning, the system comprising:
 a processor;
 a memory couple to the processor;
 a computer program code stored in the memory and executed on the processor, the computer program code configured to implement steps (a)-(m) of claim 1.

13. A system for automated scanning of a source code, the system comprising:
 a processor and a memory coupled to the processor, with computer code loaded into the memory for implementing the following functionality:
 a source code scanner core configured to receive and scan the source code;
 a pattern database accessible by the source code scanner core,
 wherein the source code scanner core is configured to
 (a) listen to a port for the source code;
 (b) determine a programming language of the source code and to load corresponding patterns that correspond to malicious vulnerabilities in the source code from the pattern database;
 (c) generate tokens from the source code, the tokens representing source code structure relating to variables and constants;
 (d) compare a line of source code to the token;
 (e) compare the patterns against the tokens, if matches are found in the line of the source code;
 (f) record locations of the tokens that match the pattern; and
 (g) provide a location of a match and a description of the pattern to a user,
 wherein the source code scanner core compares the source code against the pattern and deletes portions of the source code that match the pattern.

14. The system of claim 13, wherein the pattern database is configured to insert or delete the patterns.

15. The method of claim 1, wherein the tokens also represent keywords.

\* \* \* \* \*